(12) United States Patent
Zhang et al.

(10) Patent No.: US 12,353,507 B1
(45) Date of Patent: Jul. 8, 2025

(54) METHOD FOR DETERMINING ERROR COMPONENT OF PHOTOELECTRIC THEODOLITE AND METHOD FOR COMPENSATING ERROR COMPONENT OF PHOTOELECTRIC THEODOLITE

(71) Applicant: Changchun Institute of Optics, Fine Mechanics and Physics, Chinese Academy of Sciences, Changchun (CN)

(72) Inventors: Shixue Zhang, Changchun (CN); Jinyu Zhao, Changchun (CN); Jialiang Liu, Changchun (CN); Haojing Wang, Changchun (CN); Peifeng Wei, Changchun (CN); Junchi Liu, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 19/181,277

(22) Filed: Apr. 16, 2025

(30) Foreign Application Priority Data

Nov. 12, 2024 (CN) .......................... 202411606426.1

(51) Int. Cl.
*G06F 17/18* (2006.01)
*G01C 1/02* (2006.01)
(Continued)

(52) U.S. Cl.
CPC .............. *G06F 17/18* (2013.01); *G01C 1/02* (2013.01); *G01C 25/00* (2013.01); *G06F 17/11* (2013.01)

(58) Field of Classification Search
None
See application file for complete search history.

(56) References Cited

U.S. PATENT DOCUMENTS

2019/0383609 A1* 12/2019 Simon .................... G01C 17/38

FOREIGN PATENT DOCUMENTS

| CN | 104848874 A | * | 8/2015 | ............. G01C 25/00 |
| CN | 103727961 B | * | 7/2016 | ............. G01C 1/02 |

(Continued)

OTHER PUBLICATIONS

First Office Action issued in counterpart Chinese Patent Application No. 202411606426.1, dated Dec. 24, 2024.
(Continued)

*Primary Examiner* — Luke D Ratcliffe
(74) *Attorney, Agent, or Firm* — Westbridge IP LLC

(57) ABSTRACT

Disclosed are a method for determining an error component of a photoelectric theodolite and a method for compensating an error component of a photoelectric theodolite. A celestial region is divided into 60 sub-regions by star selection software, a star is selected from each sub-region to serve as a reference star, the theodolite is controlled to sequentially point at the reference stars, an azimuth deviation and an elevation deviation for each reference star are calculated, an axis systematic error pointing model, an azimuth error equation and an elevation error equation for the photoelectric theodolite are established, a least squares estimated value of an azimuth error component and a least squares estimated value of an elevation error component are calculated by a least squares method, a reference star with a large fitting residual is excluded, and an iterative calculation is performed repeatedly.

7 Claims, 3 Drawing Sheets

(51) Int. Cl.
*G01C 25/00* (2006.01)
*G06F 17/11* (2006.01)

(56) References Cited

FOREIGN PATENT DOCUMENTS

| | | |
|---|---|---|
| CN | 107976169 A | 5/2018 |
| CN | 115326007 A | 11/2022 |
| CN | 115342838 A | 11/2022 |

OTHER PUBLICATIONS

Gao et al., Real time error correction method for photoelectrical theodolite, Optics and Precision Engineering, vol. 15, No. 6, pp. 846-851, dated Sep. 30, 2007.
Notification to Grant Patent Right for Invention issued in counterpart Chinese Patent Application No. 202411606426.1, dated Jan. 22, 2025.

\* cited by examiner

FIG. 3

METHOD FOR DETERMINING ERROR COMPONENT OF PHOTOELECTRIC THEODOLITE AND METHOD FOR COMPENSATING ERROR COMPONENT OF PHOTOELECTRIC THEODOLITE

CROSS-REFERENCE TO RELATED APPLICATIONS

This application claims priority to Chinese Patent Application No. 202411606426.1, filed on Nov. 12, 2024, the content of which is incorporated herein by reference in its entirety.

TECHNICAL FIELD

The present disclosure relates to a field of photoelectric theodolite technology, and in particular provides a method for determining an error component of a photoelectric theodolite and a method for compensating an error component of a photoelectric theodolite.

BACKGROUND

When a photoelectric measurement device is used in field, it is necessary to calibrate an inherent systematic error of the device. As a telescope aperture increases, various assembly and alignment errors may increase accordingly. Main sources of the systematic error of the photoelectric measurement device include a vertical axis tilt error, a collimation error, a horizontal axis tilt error, an encoder zero-point deviation, a line-of-sight disturbance, etc. The vertical axis tilt error is mainly affected by a foundation levelness, the collimation error is affected by changes in a camera installation position, the encoder zero-point error is affected by a North-finding accuracy, and the line-of-sight disturbance is mainly caused by an optical axis shift of a telescope tube at different elevation angles.

In principle, if a random accuracy of the photoelectric measurement device is sufficiently high, the systematic error of the photoelectric measurement device may be substantially constant without significant changes once the photoelectric measurement device is fixed. Obtaining an accurate systematic error of the photoelectric measurement device in field is a critical factor affecting an angular measurement accuracy of the photoelectric measurement device.

Star-based calibration is a method for determining various systematic error components of a photoelectric theodolite using stars as reference, which has been applied in various optical measurement devices since the late 1980s. According to this method, 40 to 60 stars at uniform azimuth angles and elevation angles are selected from a latest star catalog (with an accuracy of up to 0.01 arc seconds) to obtain a measurement error of the stars, that is, a deviation $\Delta A$ between a real-time theoretical value and an actual measured value of an encoder and a deviation $\Delta E$ between a real-time theoretical value and an actual measured value of a target deviation, and an error component fitting is performed according to a pointing model for the photoelectric theodolite, so as to obtain an optimal estimated value of each axis pointing error of the theodolite.

Current traditional star-based calibration method for determining an error component may improve a measurement accuracy of an optoelectronic device to some extent. However, in practical applications, it has been found that multiple measurements of an error component in the same time period are quite different, and it is difficult to ensure consistency of multiple measurement results of the error component. In view of this problem, the present disclosure proposes a method for determining an error component through multiple iterations.

SUMMARY

In order to solve the above problems, the present disclosure provides a method for determining an error component of a photoelectric theodolite and a method for compensating an error component of a photoelectric theodolite, in which a reference star may be selected automatically according to star selection software for determining the error component, thereby ensuring a high consistency of error component and improving a pointing accuracy of the photoelectric theodolite.

The method for determining the error component of the photoelectric theodolite provided in the present disclosure includes:

S1 of dividing a celestial region uniformly into a plurality of sub-regions, and selecting a star in each sub-region as a reference star of the sub-region;

S2 of calculating guidance data for guiding the photoelectric theodolite according to a theoretical position of the reference star;

S3 of guiding the photoelectric theodolite to point at the reference star according to the guidance data, and recording an encoder value and a target deviation value of the photoelectric theodolite;

S4 of fitting the encoder value and the target deviation value into an actual pointing of the photoelectric theodolite, and calculating an azimuth deviation $\Delta A$ and an elevation deviation $\Delta E$ of the photoelectric theodolite according to the actual pointing and the guidance data;

S5 of establishing an axis systematic error pointing model for the photoelectric theodolite according to the azimuth deviation $\Delta A$ and the elevation deviation $\Delta E$;

S6 of establishing an azimuth error equation and an elevation error equation for the photoelectric theodolite according to the axis systematic error pointing model for the photoelectric theodolite, wherein the azimuth error equation and the elevation error equation for the photoelectric theodolite are respectively expressed as:

$$\begin{bmatrix} \Delta A_1 \\ \Delta A_2 \\ \vdots \\ \Delta A_n \end{bmatrix} = \begin{bmatrix} 1 & \sec E_{M1} - 1 & tgE_{M1} & -\sin A_{M1} \times tgE_{M1} & \cos A_{M1} \times tgE_{M1} \\ 1 & \sec E_{M2} - 1 & tgE_{M1} & -\sin A_{M2} \times tgE_{M2} & \cos A_{M2} \times tgE_{M2} \\ & & \vdots & & \\ 1 & \sec E_{M2} - 1 & tgE_{M1} & -\sin A_{Mn} \times tgE_{Mn} & \cos A_{Mn} \times tgE_{Mn} \end{bmatrix} \cdot \begin{bmatrix} g \\ c \\ b \\ v2 \\ v1 \end{bmatrix};$$

$$\begin{bmatrix} \Delta E_1 \\ \Delta E_2 \\ \vdots \\ \Delta E_n \end{bmatrix} = \begin{bmatrix} 1 & \cos E_{M1} & \sin A_{M1} & \cos A_{M1} \\ 1 & \cos E_{M2} & \sin A_{M2} & \cos A_{M2} \\ & & \vdots & \\ 1 & \cos E_{M2} & \sin A_{Mn} & \cos A_{Mn} \end{bmatrix} \cdot \begin{bmatrix} h \\ r \\ v1 \\ v2 \end{bmatrix};$$

where v1 represents a horizontal component of a vertical axis tilt error of the photoelectric theodolite, v2 represents a vertical component of the vertical axis tilt error of the photoelectric theodolite, $A_M$ represents a measured azimuth angle of a corresponding reference star, $E_M$ represents a measured elevation angle of the corresponding reference star, n represents the number of reference stars, g represents an orientation error of the photoelectric theodolite, c represents a collimation error of the photoelectric theodolite, b represents a horizontal axis tilt error of the photoelectric theodolite, r represents a coefficient of an elevation error caused by gravity sag, h represents a zero-point error of the photoelectric theodolite, and g, c, b, r and h are error components of the photoelectric theodolite;

S7 of calculating a least squares estimated value of an azimuth error component and a least squares estimated value of an elevation error component according to the azimuth error equation and the elevation error equation of the photoelectric theodolite;

S8 of calculating a pointing fitting residual for each reference star according to the least squares estimated value of the azimuth error component and the least squares estimated value of the elevation error component, calculating a standard deviation according to the pointing fitting residuals, and sequentially determining whether each pointing fitting residual is greater than three times the standard deviation; if the pointing fitting residual of a reference start is greater than three times the standard deviation, excluding the reference star and re-executing S1 to S8 based on the remaining reference stars until the pointing fitting residual of each remaining reference star is not greater than three times the standard deviation, so as to obtain a final least squares estimated value of the azimuth error component and a final least squares estimated value of the elevation error component.

Preferably, the number of the sub-regions is 60.

Preferably, the reference star is a brightest star in the sub-region.

Preferably, the azimuth deviation ΔA represents a difference between an azimuth angle of the actual pointing and an azimuth angle of the guidance data, and the elevation deviation ΔE represents a difference between an elevation angle of the actual pointing and an elevation angle of the guidance data.

Preferably, the axis systematic error pointing model is expressed as:

$$\begin{cases} \Delta A = v1\cos A_M \tan E_M - v2\sin A_M \tan E_M + b\tan E_M + c(\sec E_M - 1) + g \\ \Delta E = v2\cos A_M + v1\sin A_M + r\cdot \cos(E_M) + h \end{cases}$$

Preferably, the method for determining the error component of the photoelectric theodolite further includes: evaluating an accuracy of the least squares estimated value of the azimuth error component and the least squares estimated value of the elevation error component obtained in S8 by:

selecting a new reference star in the sub-region, calculating new guidance data according to the new reference star, compensating the new guidance data according to the least squares estimated value of the azimuth error component and the least squares estimated value of the elevation error component to obtain corrected guidance data, guiding the photoelectric theodolite to point at the new reference star using the corrected guidance data, and recording a new encoder value and a new target deviation value; and calculating a new azimuth deviation and a new elevation deviation according to the new encoder value and the new target deviation value, and determining that the accuracy of the least squares estimated value of the azimuth error component and the accuracy of the least squares estimated value of the elevation error component meet requirements when a distribution of the new azimuth deviations and the new elevation deviations meets that a root mean square error is less than 5 arc seconds.

Preferably, the new reference star is a second-brightest star in the sub-region.

The method for compensating the error component of the photoelectric theodolite includes: compensating the error component of the photoelectric theodolite according to the final least squares estimated value of the azimuth error component and the final least squares estimated value of the elevation error component.

Preferably, the method for compensating the error component of the photoelectric theodolite further includes: performing a secondary compensation for the error component of the photoelectric theodolite by using an inter-axial offset correction method, an astronomical vertical deflection correction method, or an atmospheric refraction correction method.

Compared with the prior art, the present disclosure may achieve the following beneficial effects.

In the embodiments of the present disclosure, the reference stars are selected automatically according to the celestial region by using the star selection software, which may ensure that a selection range of reference stars covers different celestial regions and a distribution in azimuth and elevation is uniform, so that an uneven density in the celestial region caused by manual star selection is avoided, and the selected reference stars are more valuable for reference. As a result, the photoelectric theodolite has a higher execution accuracy, and the calculated error component may be more consistent.

According to the embodiments of the present disclosure, when calculating the error component of the photoelectric theodolite, an iterative calculation is performed according to the fitting residuals of the reference stars, and the reference star with an abnormal fitting residual is excluded, so that the error component finally determined has high consistency and accuracy, and the compensation accuracy may be further improved.

In addition, for some special objects at close range and low elevation angles, after the error component is determined and compensated by the methods of the embodiments of the present disclosure, a secondary correction is further performed by correction means such as an inter-axis offset correction, an astronomical vertical deflection correction, and an atmospheric refraction correction, which may further improve the measurement accuracy of the photoelectric theodolite.

BRIEF DESCRIPTION OF THE DRAWINGS

FIG. 3 shows a data diagram of an error component determination result for a photoelectric theodolite according to an embodiment of the present disclosure.

DETAILED DESCRIPTION OF THE EMBODIMENTS

Figure 1:
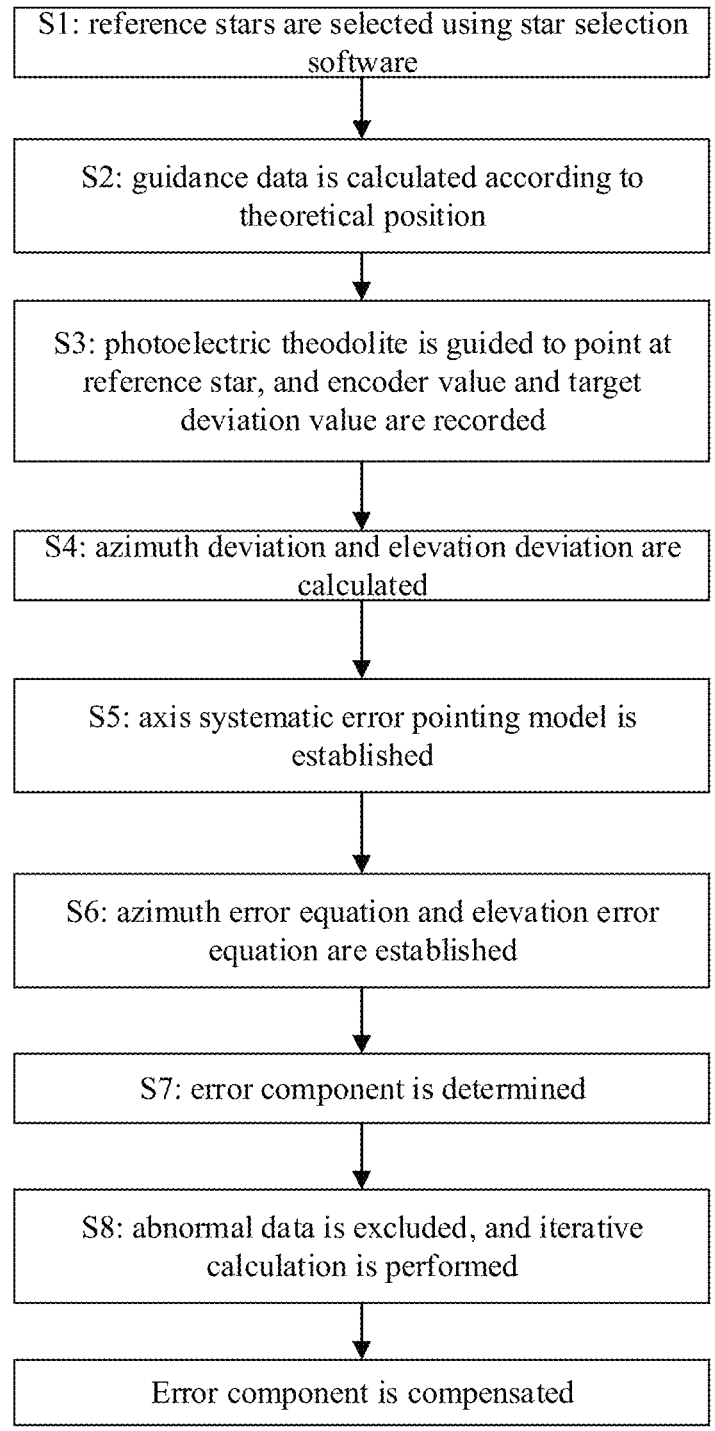
FIG. 1 shows a flowchart of determining an error component of a photoelectric theodolite according to an embodiment of the present disclosure.

Hereinafter, embodiments of the present disclosure will be described with reference to the accompanying drawings.

In the following description, the same modules are denoted by the same reference numerals. When the same reference numerals are used, their names and functions are identical. Therefore, a detailed description thereof will not be repeated.

In order to make objectives, technical solutions and advantages of the present disclosure more clearly understood, the present disclosure will be further described in detail below with reference to the accompanying drawings and specific embodiments. It should be understood that the specific embodiments described herein are merely used to explain the present disclosure, rather than limit the present disclosure.

As shown in FIG. 1, the present disclosure provides a method for determining an error component of a photoelectric theodolite and a method for compensating an error component of a photoelectric theodolite, including following steps.

In S1, some stars are selected as reference stars before a determination of the error component of the photoelectric theodolite. To ensure an accuracy of the determination of the error component, the selected reference stars should be distributed as uniformly as possible across all regions of the entire celestial region. Conventional determination methods rely on manual selection of stars in the celestial region as reference stars, which cannot guarantee uniformity of the reference stars. A star selection software is used to select reference stars in the embodiments of the present disclosure.

By using the star selection software, the celestial region with an elevation angle between 20° and 65° is uniformly divided into a plurality of sub-regions. In the embodiments of the present disclosure, the number of sub-regions is represented by n, and a brightest star in each sub-region is selected as the reference star in that sub-region, so that n reference stars may be obtained, which are used as the basis for calculating the error component of the photoelectric theodolite. In the embodiments of the present disclosure, the value of n is set to 60, that is, the celestial region with an elevation angle between 20° and 65° is uniformly divided into 60 sub-regions, and 60 reference stars are selected accordingly.

During the selection of reference stars, it is not necessary to select the brightest stars. However, since the brightest stars may facilitate observation, it is an optimal reference star selection method to select the brightest stars as the reference stars.

In S2, after the reference stars are determined, a real-time reduction of theoretical position is performed for the selected 60 reference stars according to a star catalog epoch $t_0$ (standard epoch J2000.0 is adopted in the embodiments of the present disclosure). A position and a proper motion of the reference star in an astronomical reference frame at the star catalog epoch $t_0$ are as follows: a right ascension of the reference star is represented by $\alpha_0$ (in radians), a declination of the reference star is represented by $\delta_0$ (in radians), a proper motion velocity of the reference star in a right ascension direction is represented by $u_{\delta_0}$, (in seconds of time per Julian century), a proper motion velocity of the reference star in a declination direction is represented by $u_{\delta_0}$, (in arc seconds per Julian century), astronomical longitude and latitude of the observation station in the terrestrial reference frame are represented by $\lambda_0$ (in radians) and $\phi_0$ (in radians), and the Julian day (including a decimal part of a day) corresponding to the observation epoch t at Coordinated Universal Time UTC for the reference star is represented by $JD_i$.

In Q2, instantaneous astronomical longitude and latitude $\lambda$ and $\phi$ of the reference star are calculated as follows.

$$\lambda = \lambda_0 + (x_p \sin \lambda_0 + y_p \cos \lambda_0) tg\phi_0;$$

$$\phi = \phi_0 + (x_p \cos \lambda_0 - y_p \sin \lambda_0)$$

where $x_p$ and $y_p$ are Earth rotation parameters describing polar motion phenomena during the Earth rotation, representing motion components of an instantaneous rotation angular velocity direction relative to a fixed point near the Earth's North Pole (typically the Conventional International Origin CIO), in which $x_p$ represents the component of the polar motion in the X-axis direction, and $y_p$ represents the component of the polar motion in the Y-axis direction. $\Delta UT1$, $x_p$ and $y_p$ are published by the International Earth Rotation and Reference Systems Service IERS.

In Q3, taking into account a proper motion of the reference star (the proper motion is a motion of star in space, and a size and direction of the proper motion may be obtained by astronomical observation and calculation. The proper motion reflects a transverse motion of the star relative to the observer and is a combination of an intrinsic motion and an apparent motion of the star), a corresponding proper motion correction of the reference star is performed as follows.

$$\alpha_1 = \alpha_0 + u_{\alpha_0} \times T;$$

$$\delta_1 = \delta_0 + u_{\delta_0} \times T;$$

where $\alpha_1$ represents a corrected right ascension of the reference star, and $\delta_1$ represents a corrected declination of the reference star.

In Q4, an epoch mean position $\vec{r}_0$ of the reference star is calculated as follows.

$$\vec{r}_0 = \begin{pmatrix} \cos \alpha_1 \cos \delta_1 \\ \sin \alpha_1 \cos \delta_1 \\ \sin \delta_1 \end{pmatrix}.$$

In Q5, a precession matrix P and a nutation matrix N for the reference star are calculated as follows (the position of star on the celestial sphere may change slightly over time due to the motion of Earth's rotation axis (precession) and a gravitational effect of the Moon, Sun, etc. on the Earth (nutation). Therefore, it is necessary to apply a precession correction and a nutation correction when calculating the theoretical position of star).

$$P = R_z(-z_A) R_y(-\theta_A) R_z(-\zeta_A);$$

$$N = R_x(-\varepsilon_A - \Delta\varepsilon) R_z(-\Delta\psi) R_x(\varepsilon_A);$$

where $\zeta_A$, $\theta_A$, $z_A$ represent the luni-solar precession, the planetary precession and the precession-nutation coupling respectively, which are calculated as follows.

$$\zeta_A = 2306.''21817T + 0.''30188T^2 + 0.''017998T^3;$$

$$\theta_A = 2306.''21817T + 1.''09468T^2 - 0.''018203T^3$$

$$z_A = 2004.''3109T - 0.''42665T^2 - 0.''041833T^3;$$

where $\varepsilon_A$ represents an obliquity of the ecliptic, $\Delta\varepsilon$ represents the nutation in longitude (in radians), and $\Delta\psi$ represents the nutation in obliquity (in radians), $$\varepsilon_A = 84381.''448 - 46.''8150T - 0.''00059T^2 + 0.''001813T^3;$$

$R_x(\theta)$, $R_y(\theta)$, $R_z(\theta)$ represent rotation matrices of the spatial position around x, y, z axes, respectively.

A position vector $\vec{r}_1$ of the star relative to the true equator and true equinox at the observation epoch is then expressed as:

$$\vec{r}_1 = NP\vec{r}_0;$$

In Q6, an annual aberration (which is an apparent displacement of the star position caused by a constant motion of the Earth around the Sun) is corrected when calculating the theoretical position of the reference star.

A position vector $\vec{r}_s$ of the Sun relative to the true equator and true equinox at the observation epoch is calculated, and an angle $\gamma$ between $\vec{r}_1$ and $\vec{r}_s$ is expressed as:

$$\sin\gamma = \frac{|\vec{r}_1 \times \vec{r}_s|}{|\vec{r}_1||\vec{r}_s|};$$

A position vector of the reference star after the annual aberration correction is denoted by $\vec{r}_2$, which is expressed as:

$$\vec{r}_2 = \frac{\sin(\gamma - 20.496\sin\gamma/206264.8)}{\sin\gamma}\vec{r}_1 + \frac{\sin(20.496\sin\gamma/206264.8)}{\sin\gamma}\vec{r}_s.$$

This is the apparent position of the reference star relative to the true equinox and true equator at the observation epoch. No diurnal aberration correction is performed here because a maximum diurnal aberration is 0.39 arc seconds.

In Q7, a position vector $\vec{R}$ of the reference star in the horizontal coordinate system is calculated.

The Greenwich Sidereal Time GST at the observation epoch is first calculated as follows:

$$GST = GST_0 + DUT1 \times \text{ratio} + \Delta\psi \cos\varepsilon_A;$$

where $GST_0 = 6^h41^m50.^s54841 + 8640184.^s812866\tau + 0.^s093104\tau^2 - 6.^s2 \times 10^{-6}\tau^3$,
DUT1 is a decimal part of UT1 day,
UT1=UTC+ΔUT1,ratio=$1.00273909350795 + 5.9006 \times 10^{-11}\tau - 5.9 \times 10^{-15}\tau^2$,
and $\Delta\psi$ represents the nutation in longitude.

Then the local sidereal time S for the observation station is expressed as:

$$S = GST + \lambda$$

$$\vec{R} = R_y(\phi - \pi/2)R_z(S - \pi)\vec{r}_2;$$

where, $$\vec{R} = \begin{pmatrix} \cos E_0 \cos A_0 \\ -\cos E_0 \sin A_0 \\ \sin E_0 \end{pmatrix};$$

According to $\vec{R}$, an azimuth value $A_0$ and an elevation value $E_0$ for the star may be calculated, which represent the required theoretical position of the reference star.

Due to atmospheric refraction, an observed star position is different from a true star position. An observed star altitude should be subtracted by the atmospheric refraction to obtain a true star altitude. The greater the zenith distance of the star, the greater the atmospheric refraction. The atmospheric refraction may vary with changes in temperature and atmospheric pressure. When the theoretical value of the star position is used as the guidance data, it is necessary to perform an atmospheric refraction correction, that is, an atmospheric refraction correction may be performed for the above-mentioned theoretical positions $A_0$ and $E_0$ of the reference star.

$$A_c = A_0.$$

$$E_c = E_0 + 60.2 \times \frac{273 \times p}{1013 \times T} \times \cos E_0;$$

where P and T represent the atmospheric pressure and the temperature of the observation station respectively, $A_c$ and $E_c$ represent the azimuth angle and the elevation angle of the theoretical position of the reference star after the atmospheric refraction correction.

After the theoretical position of the reference star is obtained, it is used as the guidance data for the photoelectric theodolite to guide the photoelectric theodolite to point at the reference star. Theoretically, when an error-free photoelectric theodolite is guided with the theoretical position of the reference star as the guidance data, an actual encoder value and an actual target deviation of the photoelectric theodolite should be consistent with the theoretical position of the reference star. Any inconsistence indicates an error component of the photoelectric theodolite. Therefore, the error component of the photoelectric theodolite may be calculated according to this principle.

The theoretical position of the reference star includes values in the horizontal coordinate system, i.e., the azimuth angle and the elevation angle of the observed star. According to the theoretical positions of the n reference stars, n guidance data for the photoelectric theodolite may be calculated as follows.

Horizontal polar coordinates of the theoretical position of the reference star are first converted into horizontal rectangular coordinates as follows.

$$\begin{cases} X_c = \cos E_c \cos A_c \\ Y_c = \sin E_c \\ Z_c = \cos E_c \sin A_c \end{cases};$$

where $X_c$, $Z_c$, $Y_c$ represent geocentric rectangular coordinates of the reference star.

The horizontal rectangular coordinates are then converted into polar coordinates as follows:

$$A_j = \arctan(Z_j/X_j)$$

$$E_j = \arcsin(Y_j)$$

where $X_j$, $Z_j$, $Y_j$ represent topocentric rectangular coordinates of the reference star relative to a site of the observation station. The azimuth value $A_j$ and the elevation value $E_j$ are directly used as the guidance data for the photoelectric theodolite to guide a servo tracking system to point at the reference star.

In S3, the photoelectric theodolite is guided to point at the n reference stars sequentially according to the n guidance data (the number of guidance data calculated for the photoelectric theodolite is identical to the number of reference stars, which is n, because each reference star has its own theoretical position), and the encoder values and the target deviation values corresponding to the n guidance data are recorded respectively to calculate the error component of the photoelectric theodolite.

In S4, the encoder values and the target deviation values recorded in S3 are matched respectively, and are fitted into n actual pointing of the photoelectric theodolite. The n actual pointing is an actual response of the photoelectric theodolite according to the n guidance data. According to the n actual pointing and the n guidance data, n azimuth deviations ΔA and n elevation deviations ΔE of the photoelectric theodolite may be calculated. The azimuth deviation ΔA is a difference between the azimuth angle of the actual pointing and the azimuth angle of the guidance data. The elevation deviation ΔE is a difference between the elevation angle of the actual pointing and the elevation angle of the guidance data.

The position of each reference star may be stored with a plurality of frames of data. After averaging, these data may be used to eliminate a random error in an image extraction. Generally, a total of 40 to 60 reference stars are selected, with elevation angles distributed between 25 degrees and 70 degrees (mainly to reduce the effect of the atmospheric refraction). The deviation value between the theoretical pointing and the actual pointing for each reference star is obtained for calibration.

In S5, according to the azimuth deviation ΔA and the elevation deviation ΔE, an axis systematic error pointing model for the photoelectric theodolite (the axis systematic error of the photoelectric theodolite mainly includes an azimuth error and an elevation error) is established as follows:

$$\begin{cases} \Delta A = v1\cos A_M \tan E_M - v2\sin A_M \tan E_M + b\tan E_M + c(\sec E_M - 1) + g \\ \Delta E = v2\cos A_M + v1\sin A_M + r\cdot \cos(E_M) + h \end{cases}$$

where v1 represents a horizontal component of a vertical axis tilt error of the photoelectric theodolite, v2 represents a vertical component of the vertical axis tilt error of the photoelectric theodolite, $A_M$ represents a measured azimuth angle of the corresponding reference star, $E_M$ represents a measured elevation angle of the corresponding reference star, g represents an orientation error of the photoelectric theodolite, c represents a collimation error of the photoelectric theodolite, b represents a horizontal axis tilt error of the photoelectric theodolite, r represents a coefficient of an elevation error caused by gravity sag, h represents a zero-point error of the photoelectric theodolite, in which g, c, b, r and h are all error components of the photoelectric theodolite.

In S6, according to the axis systematic error pointing model for the photoelectric theodolite, an azimuth error equation and an elevation error equation for the photoelectric theodolite are established as follows.

$$\begin{bmatrix} \Delta A_1 \\ \Delta A_2 \\ \vdots \\ \Delta A_n \end{bmatrix} = \begin{bmatrix} 1 & \sec E_{M1} - 1 & tgE_{M1} & -\sin A_{M1} \times tgE_{M1} & \cos A_{M1} \times tgE_{M1} \\ 1 & \sec E_{M2} - 1 & tgE_{M1} & -\sin A_{M2} \times tgE_{M2} & \cos A_{M2} \times tgE_{M2} \\ & & \vdots & & \\ 1 & \sec E_{M2} - 1 & tgE_{M1} & -\sin A_{Mn} \times tgE_{Mn} & \cos A_{Mn} \times tgE_{Mn} \end{bmatrix} \cdot \begin{bmatrix} g \\ c \\ b \\ v2 \\ v1 \end{bmatrix};$$

$$\begin{bmatrix} \Delta E_1 \\ \Delta E_2 \\ \vdots \\ \Delta E_n \end{bmatrix} = \begin{bmatrix} 1 & \cos E_{M1} & \sin A_{M1} & \cos A_{M1} \\ 1 & \cos E_{M2} & \sin A_{M2} & \cos A_{M2} \\ & \vdots & & \\ 1 & \cos E_{M2} & \sin A_{Mn} & \cos A_{Mn} \end{bmatrix} \cdot \begin{bmatrix} h \\ r \\ v1 \\ v2 \end{bmatrix};$$

where the azimuth deviation ΔA and the elevation deviation ΔE are theoretical values of the azimuth error and the elevation error respectively. The closer the azimuth error and the elevation error are to the azimuth deviation ΔA and the elevation deviation ΔE, the closer the error components obtained by solving the azimuth error equation and the elevation error equation are to the actual values, that is, the more accurate they are.

In S7, the solution of the above equations is converted into a linear regression problem to establish a linearized regression equation ΔY=C□X, where ΔY may be understood as a set of observed values, X may be understood as a set of independent variables, and C represents a coefficient matrix. The objective is to find linear model parameters that best fit these data. By using the least squares method, an estimated value of X is $\hat{X}=(C^TC)^{-1}C^T\square\Delta Y$ then the least squares estimated value of the azimuth error component and the least squares estimated value of the elevation error component are expressed as follows.

$$\hat{X}_A = \begin{bmatrix} g \\ c \\ b \\ v2 \\ v1 \end{bmatrix};$$

$$\hat{X}_E = \begin{bmatrix} h \\ r \\ v1 \\ v2 \end{bmatrix};$$

where $\hat{X}_A$ and $\hat{X}_E$ represent the least squares estimated value of the azimuth error component and the least squares estimated value of the elevation error component respectively.

In order to ensure the accuracy of the determined error component, it is possible to evaluate an accuracy of the least squares estimated value of the azimuth error component and the least squares estimated value of the elevation error component. A specific evaluation method is as follows.

A new reference star is selected in each sub-region, so as to obtain a set of new reference stars. A method for selecting the new reference stars is similar to the method for selecting the reference stars described in S1, but the new reference starts are different from the reference stars selected in S1. A second-brightest star may be selected as the new reference star. According to the new reference stars, new guidance data may be calculated using the same method described in S2. The new guidance data may be compensated according to the calculated least squares estimated value of the azimuth error component and the calculated least squares estimated value of the elevation error component, so as to obtain corrected guidance data. At this time, if the calculated least squares estimated value of the azimuth error component and the calculated least squares estimated value of the elevation error component are accurate and error-free, the corrected new guidance data should be guidance data in an ideal state. The photoelectric theodolite may be guided to point at the new reference stars sequentially by using the corrected guidance data, and new encoder values and new target deviation values may be recorded.

New azimuth deviations and new elevation deviations may be calculated according to the new encoder values and the new target deviation values. When a distribution of the new azimuth deviations and the new elevation deviations meets the requirement that a root mean square error is less than 5 arc seconds, it is considered that the accuracy of the calculated least squares estimated value of the azimuth error component and the calculated least squares estimated value of the elevation error component meet requirements.

Figure 2:
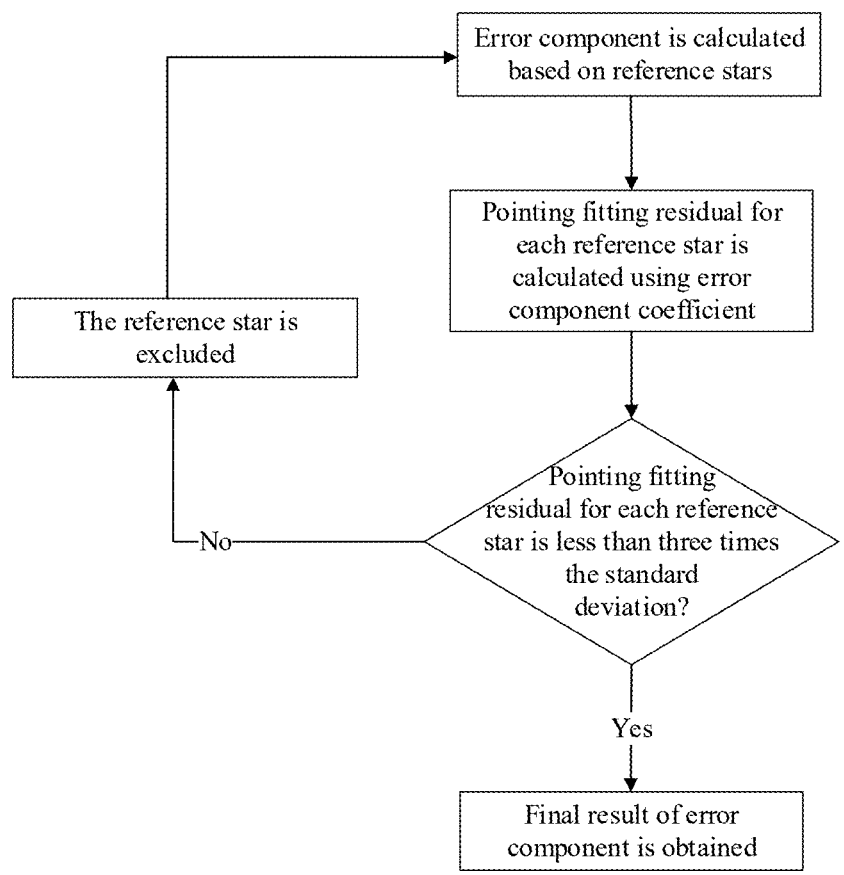
FIG. 2 shows a flowchart of iteration of an error component of a photoelectric theodolite according to an embodiment of the present disclosure.

In S8, as shown in FIG. 2, after the error component coefficient is calculated, a pointing fitting residual for the position of each reference star may be calculated, and a standard deviation may be calculated according to the pointing fitting residual. When a reference star has a large pointing fitting residual, it is considered that the theoretical position of the reference star may have a deviation. In the embodiments of the present disclosure, three times the standard deviation is taken as a threshold. If the pointing fitting residual is greater than three times the standard deviation, it is considered that the reference star has a large pointing fitting residual. In this case, it is possible to exclude relevant data of the reference star and recalculate the error component for the remaining reference stars. Such iterative calculation may be performed repeatedly until the pointing fitting residual for each remaining reference star is less than three times the standard deviation. At this point, it is considered that the determination result of the error component is reasonable and reliable, which may be used for real-time correction of the photoelectric theodolite and post-calculation of measurement accuracy of the observed object. A specific process is as follows.

The pointing fitting residual for the position of each reference star is calculated according to the least squares estimated value $\hat{X}_A$ of the azimuth error component and the least squares estimated value $\hat{X}_E$ of the elevation error component, a standard deviation is calculated according to the pointing fitting residuals, and it is sequentially determined whether each pointing fitting residual is greater than three times the standard deviation.

If the pointing fitting residual for a reference star is greater than three times the standard deviation, the reference star is excluded, and steps S1 to S8 are re-executed based on the remaining reference stars until the pointing fitting residual for each remaining reference star is not greater than three times the standard deviation, so as to obtain a final least squares estimated value of the azimuth error component and a final least squares estimated value of the elevation error component.

Figure 3:
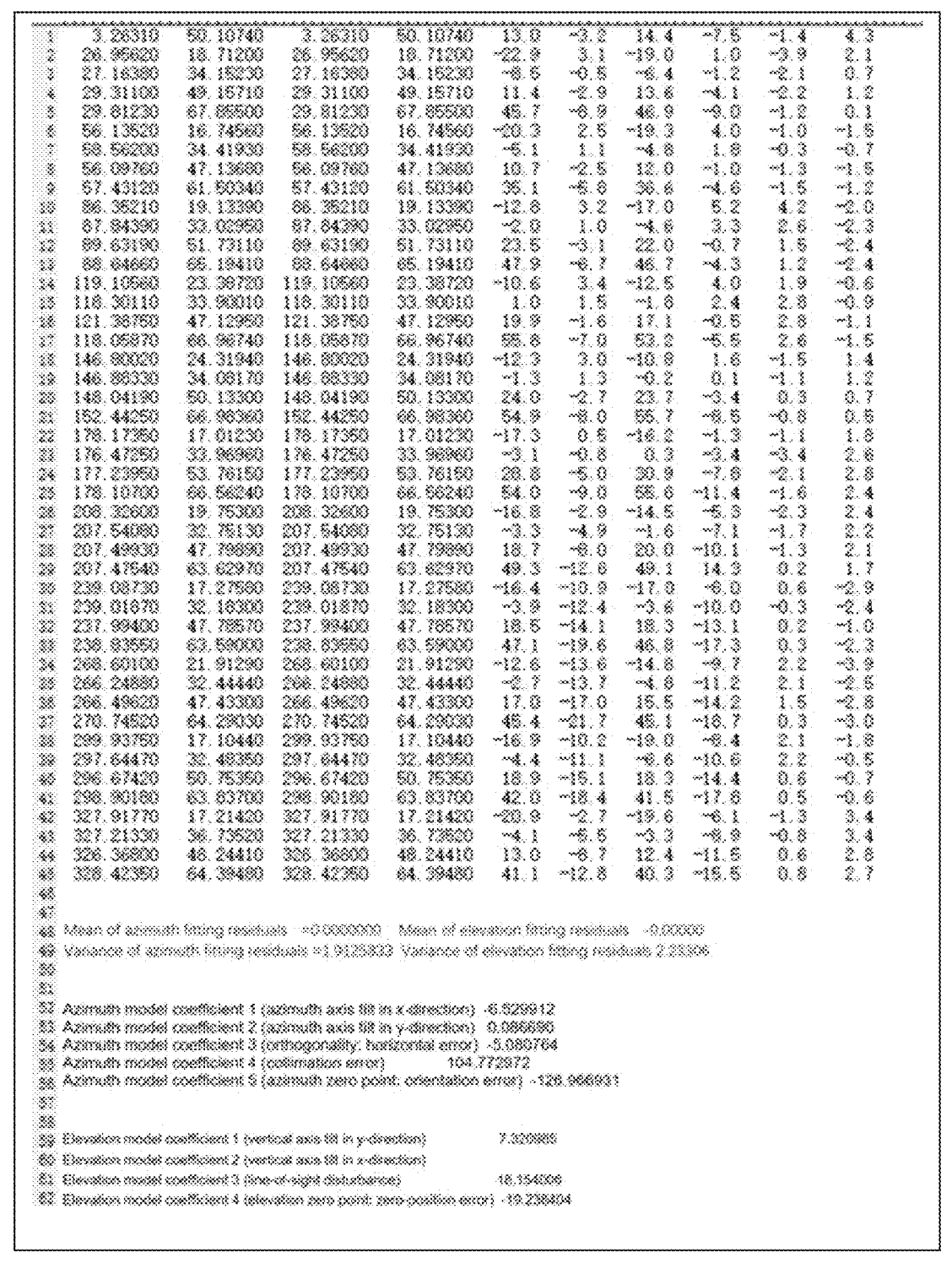

When verifying the embodiments of the present disclosure, a data diagram of error component determination results shown in FIG. 3 is obtained.

The error component of the photoelectric theodolite may be compensated according to the final least squares estimated value of the azimuth error component and the final least squares estimated value of the elevation error component.

For most observed objects, after the determination and compensation of the error component using the above methods, the photoelectric theodolite may generally have a high angular measurement accuracy. However, for a special observed object at a low elevation angle and a short distance, the photoelectric theodolite may have a large angular measurement error and may still fail to reach a high angular measurement accuracy even after the compensation with the above-mentioned methods. Factors affecting the error may include an accuracy of station site, a calculation accuracy of atmospheric refraction, etc. Therefore, a secondary correction may be performed on the photoelectric theodolite after the error component correction is performed using the above-mentioned methods. The embodiments of the present disclosure further propose correction means such as an inter-axial offset correction, an astronomical vertical deflection correction and an atmospheric refraction correction to perform a secondary correction of the error component of the photoelectric theodolite, which may further improve the measurement accuracy of the photoelectric theodolite.

In the inter-axis offset correction, an inter-axis offset refers to a position deviation between a main-axis optical path and an off-axis optical path of the photoelectric theodolite. In practical observations, the photoelectric theodolite uses multiple detectors to obtain a target image. When actually calculating a measurement accuracy of an off-axis image, it is necessary to calculate a real-time position of the off-axis optical path according to the angle of the encoder of the photoelectric theodolite on the basis of the current observation station site, and this position is used as a new station site to calculate the angular measurement position. After the inter-axis offset correction is incorporated, the measurement accuracy of the photoelectric theodolite may be further improved.

The coordinates of the observation station site are generally in the geodetic coordinate system (CGCS2000), while the theoretical positions of common celestial objects (stars, planets, etc.) are calculated using the astronomical coordinate system. There may be slight deviations between the two coordinate systems. The astronomical coordinate system is a coordinate system that uses the celestial pole and the vernal equinox as an orientation reference for the celestial sphere, representing a position of a ground point on the geoid, with the plumb line and the geoid as reference. For a distant object more than 20 kilometers away, the coordinate system error may be ignored. However, when measuring an angle of a close-range object, it is necessary to convert the coordinates of the station site into astronomical coordinates by correcting a plumb line deviation. A specific correction method is to multiply the geodetic coordinates of the current station site by a plumb line deviation correction matrix to obtain astrogeodetic coordinates of the station site.

The atmospheric refraction refers to a difference between an observed direction of the object and an actual direction of the object due to refraction of atmosphere, which mainly affects the elevation angle of observation. The atmospheric refraction is mainly related to atmospheric pressure, temperature, humidity, and the elevation angle of observation. In a case of a low elevation angle, there is currently no unified formula for calculating the atmospheric refraction, and various formulas for calculating the atmospheric refraction have significant differences. In practical applications, a specific value of the atmospheric refraction may be calibrated by multiple azimuth markers at a low elevation angle, and an atmospheric refraction value at the current elevation angle may be estimated based on empirical data.

Although the embodiments of the present disclosure have been shown and described above, it should be understood that the above embodiments are exemplary and are not to be construed as limiting the present disclosure. Those ordinary skilled in the art may make changes, modifications, substitutions and variations to the above-mentioned embodiments within the scope of the present disclosure.

The above specific implementations of the present disclosure do not constitute limitations on the protection scope of the present disclosure. Any other corresponding changes and modifications made according to the technical concept of the present disclosure should be included in the protection scope of the claims of the present disclosure.

What is claimed is:

1. A method for determining an error component of a photoelectric theodolite, comprising:

S1: dividing a celestial region uniformly into a plurality of sub-regions, and selecting a star in each sub-region as a reference star of the sub-region;

S2: calculating guidance data for guiding the photoelectric theodolite according to a theoretical position of the reference star;

S3: guiding the photoelectric theodolite to point at the reference star according to the guidance data, and recording an encoder value and a target deviation value of the photoelectric theodolite;

S4: fitting the encoder value and the target deviation value into an actual pointing of the photoelectric theodolite, and calculating an azimuth deviation $\Delta A$ and an elevation deviation $\Delta E$ of the photoelectric theodolite according to the actual pointing and the guidance data, wherein the azimuth deviation $\Delta A$ represents a difference between an azimuth angle of the actual pointing and an azimuth angle of the guidance data, and the elevation deviation $\Delta E$ represents a difference between an elevation angle of the actual pointing and an elevation angle of the guidance data;

S5: establishing an axis systematic error pointing model for the photoelectric theodolite according to the azimuth deviation $\Delta A$ and the elevation deviation $\Delta E$, wherein the axis systematic error pointing model is expressed as:

$$\begin{cases} \Delta A = v1\cos A_M \tan E_M - v2\sin A_M \tan E_M + b\tan E_M + c(\sec E_M - 1) + g \\ \Delta E = v2\cos A_M + v1\sin A_M + r\cdot\cos(E_M) + h \end{cases};$$

S6: establishing an azimuth error equation and an elevation error equation for the photoelectric theodolite according to the axis systematic error pointing model for the photoelectric theodolite, wherein the azimuth error equation and the elevation error equation for the photoelectric theodolite are respectively expressed as:

$$\begin{bmatrix} \Delta A_1 \\ \Delta A_2 \\ \vdots \\ \Delta A_n \end{bmatrix} =$$

$$\begin{bmatrix} 1 & \sec E_{M1} - 1 & tgE_{M1} & -\sin A_{M1} \times tgE_{M1} & \cos A_{M1} \times tgE_{M1} \\ 1 & \sec E_{M2} - 1 & tgE_{M1} & -\sin A_{M2} \times tgE_{M2} & \cos A_{M2} \times tgE_{M2} \\ & & \vdots & & \\ 1 & \sec E_{M2} - 1 & tgE_{M1} & -\sin A_{Mn} \times tgE_{Mn} & \cos A_{Mn} \times tgE_{Mn} \end{bmatrix} \cdot \begin{bmatrix} g \\ c \\ b \\ v2 \\ v1 \end{bmatrix};$$

$$\begin{bmatrix} \Delta E_1 \\ \Delta E_2 \\ \vdots \\ \Delta E_n \end{bmatrix} = \begin{bmatrix} 1 & \cos E_{M1} & \sin A_{M1} & \cos A_{M1} \\ 1 & \cos E_{M2} & \sin A_{M2} & \cos A_{M2} \\ & & \vdots & \\ 1 & \cos E_{M2} & \sin A_{Mn} & \cos A_{Mn} \end{bmatrix} \cdot \begin{bmatrix} h \\ r \\ v1 \\ v2 \end{bmatrix};$$

where v1 represents a horizontal component of a vertical axis tilt error of the photoelectric theodolite, v2 represents a vertical component of the vertical axis tilt error of the photoelectric theodolite, $A_M$ represents a measured azimuth angle of a corresponding reference star, $E_M$ represents a measured elevation angle of the corresponding reference star, n represents the number of reference stars, g represents an orientation error of the photoelectric theodolite, c represents a collimation error of the photoelectric theodolite, b represents a horizontal axis tilt error of the photoelectric theodolite, r represents a coefficient of an elevation error caused by gravity sag, h represents a zero-point error of the photoelectric theodolite, and g, c, b, r and h are error components of the photoelectric theodolite;

S7: calculating a least squares estimated value of an azimuth error component and a least squares estimated value of an elevation error component according to the azimuth error equation and the elevation error equation of the photoelectric theodolite; and S8: calculating a pointing fitting residual for each reference star according to the least squares estimated value of the azimuth error component and the least squares estimated value of the elevation error component, calculating a standard deviation according to the pointing fitting residuals, and sequentially determining whether each pointing fitting residual is greater than three times the standard deviation; if the pointing fitting residual of a reference start is greater than three times the standard deviation, excluding the reference star and re-executing S1 to S8 based on the remaining reference stars until the pointing fitting residual of each remaining reference star is not greater than three times the standard deviation, so as to obtain a final least squares estimated value of the azimuth error component and a final least squares estimated value of the elevation error component.

2. The method for determining the error component of the photoelectric theodolite according to claim 1, wherein the number of the sub-regions is 60.

3. The method for determining the error component of the photoelectric theodolite according to claim 1, wherein the reference star is a brightest star in the sub-region.

4. The method for determining the error component of the photoelectric theodolite according to claim 1, further comprising: evaluating an accuracy of the least squares estimated value of the azimuth error component and the least squares estimated value of the elevation error component obtained in S8 by:

selecting a new reference star in the sub-region, calculating new guidance data according to the new reference star, compensating the new guidance data according to the least squares estimated value of the azimuth error component and the least squares estimated value of the elevation error component to obtain corrected guidance data, guiding the photoelectric theodolite to point at the new reference star using the corrected guidance data, and recording a new encoder value and a new target deviation value; and calculating a new azimuth deviation and a new elevation deviation according to the new encoder value and the new target deviation value, and determining that the accuracy of the least squares estimated value of the azimuth error component and the accuracy of the least squares estimated value of the elevation error component meet requirements when a distribution of the new azimuth deviations and the new elevation deviations meets that a root mean square error is less than 5 arc seconds.

5. The method for determining the error component of the photoelectric theodolite according to claim 4, wherein the new reference star is a second-brightest star in the sub-region.

6. A method for compensating an error component of a photoelectric theodolite, comprising: compensating the error component of the photoelectric theodolite according to the final least squares estimated value of the azimuth error component and the final least squares estimated value of the elevation error component determined according to claim 1.

7. The method for compensating the error component of the photoelectric theodolite according to claim 6, further comprising: performing a secondary compensation for the error component of the photoelectric theodolite by using an inter-axial offset correction method, an astronomical vertical deflection correction method, or an atmospheric refraction correction method.

* * * * *